Patented Apr. 10, 1951

2,548,801

UNITED STATES PATENT OFFICE 2,548,801

METHOD OF FORMING HIGHLY ACTIVE CATALYTIC SURFACES

James E. Latta, Tulsa, Okla., assignor to Stanolind Oil and Gas Company, Tulsa, Okla., a corporation of Delaware No Drawing. Application August 9, 1949, Serial No. 109,423

5 Claims. (Cl. 260—449.6)

My invention relates to the catalytic reduction of carbon monoxide with hydrogen to produce hydrocarbons of varying molecular weight together with certain oxygenated organic compounds. More particularly, it pertains to a method for distributing the catalyst in the form of a thin film on the interior surfaces of a suitable synthesis reactor in a manner such that the resulting catalyst becomes extremely active and is capable, on a weight basis, of converting a high percentage of carbon monoxide into useful products.

Modern hydrocarbon synthesis plants now being constructed for large scale operations, i. e., plants capable of producing approximately 6,000 bbls. of oil per day, are designed to employ about 500,000 lbs. of catalyst in the reactors provided. The utilization of catalyst in such quantities has numerous disadvantages. First of all, to handle the volume of catalyst indicated, considerable storage space and special treating equipment, such as regeneration units, mixers for impregnation of the catalyst with suitable promoters, etc., are required. Also, notwithstanding the fact that comparatively inexpensive iron catalysts have been developed which give as good or better conversions and yields as any other type of catalyst employed, it will be apparent that the utilization of such a catalyst in the above-mentioned quantities will result in a substantial expenditure regardless of whether or not provisions are made for catalyst regeneration or whether it is planned to continuously replace spent catalyst with fresh material. Moreover, once the reaction is initiated in a synthesis reactor containing the catalyst in the form of a fluidized bed, the problem of maintaining the catalyst suspended in a uniform fluid bed frequently becomes quite difficult. For example, it is not uncommon to find that the catalyst has settled out in the bottom of the reactor and that the synthesis gas has channeled its way through the bed. Under such conditions, little or no conversion to useful products occurs. Often times, when the catalyst bed does not fluidize properly, it tends to bridge across adjacent cooling surfaces and form fixed masses, thus impairing heat removal. Also, even when conversion in a fluidized bed appears to be running smoothly, special instrumentation is required to periodically determine the height and density of the bed.

In the past, attempts have been made to coat the interior surfaces of reactors, in which catalytic vapor phase reactions could be effected, with a thin film of a suitable catalyst held to the heating or cooling surfaces of the reactor by means of an adhesive or the like. It was found, however, that the catalyst layer, disposed on the reactor surfaces in such a manner, cracked off after the reaction had proceeded for only a relatively short time. Also, the material employed, as the binder, adversely affected the activity of the catalyst; and because of its insulating effect, it interfered with the heat transfer as well.

Accordingly, it is an object of my invention to provide a method for disposing a hydrocarbon synthesis catalyst about the interior surfaces of a synthesis reactor in the form of a thin adherent film in which the binder holding the catalyst thereto, during synthesis, is produced by the reaction. It is a further object of my invention to provide a method for coating the synthesis reactor walls with a highly active catalyst in a manner such that the heat of reaction may be readily transferred from the catalyst film to the reactor walls and thereby avoid overheating of the catalyst. It is a still further object of my invention to provide a method for applying a catalyst to the walls of a synthesis reactor so as to retain the well known advantages of a surface-type reactor while, at the same time, eliminating the long and drastic treatment required to produce a catalytic surface from the base metal.

In accordance with my invention any of the known hydrocarbon synthesis catalysts, for example, an iron catalyst, in finely divided form, preferably about —100 mesh, is impregnated with a suitable promoter, such as potassium carbonate, in a known manner and in sufficient concentration so that the resulting catalyst, after drying at elevated temperature, contains from about 0.5 to about 1.5 per cent of potassium oxide. The promoted catalyst thus obtained is then preferably suspended or dispersed in a suitable fraction of synthetic oil or melted wax and is sprayed onto the clean interior surfaces of the reactor walls. In depositing the catalyst about the walls of the reactor in this manner, suspensions containing the catalyst in concentrations of from about 1 to about 25 weight per cent may be utilized although higher concentrations of catalyst may be employed, if desired. Alternatively, the catalyst may be applied to the reactor walls by first coating the latter with a thin film of a suitable oil or melted wax and thereafter spraying the catalyst in finely divided form onto the oily surface of the reactor walls in the presence of a gas inert with respect to the catalyst at the temperature of application. Also, if desired, the dry promoted catalyst in finely divided form may be blown onto the reactor surfaces and allowed to deposit in the form of a film. The wax or heavy oil produced by the reaction then serves to maintain the catalyst in place during synthesis.

After the reactor walls have been coated in the manner indicated, the raw metal catalyst which has an appreciable oxide content is preferably reduced with hydrogen until water can no longer be detected in the exit gases. Thereafter, if desired, the catalyst may be subjected to an activation period consisting of effecting reduction of carbon monoxide with hydrogen in the presence of the catalyst at 500° to 600° F. and at a pressure of about 250 p. s .i. g. for about 50 to 70 hours.

The oil or wax employed is disposing the catalyst about the reactor walls functions as a temporary binder to cause the catalyst to adhere. However, this binder, during synthesis, is transformed and is continuously replaced by the wax or heavy oil produced by the reaction and deposited on the walls thus allowing the catalyst to be retained on the reactor walls in highly active form. Catalytic films obtained in this manner may vary in thickness but, in general, are found to range in thickness from about 0.01 to about 0.06 of an inch, or more, and because of their ability to lose heat relatively rapidly to the reactor walls constitute an ideal binder for the powdered catalyst.

The process of my invention is not restricted to any particular reactor design but, in general, may be utilized in applying hydrocarbon synthesis catalyst to the walls of any conventional synthesis reactor. Ordinarily, however, I prefer to employ a multiple tube type reactor so that a relatively high ratio of reactor surface area to synthesis gas volume is available. Thus, the catalyst may be deposited in the manner set forth above on the exterior of a bundle of narrow tubes whereby synthesis gas passes over the tubes while a suitable heat exchange medium is circulated through the tubes; or the interior of the tubes may be coated with catalyst in accordance with my invention and gas may flow through the tubes while the heat exchange medium passes around the exterior. The reactor tubes may also be provided with fins or other devices projected from the surface thereof.

Synthesis of hydrocarbons may be effected in conventional reactors coated with catalyst as herein set forth by subjecting carbon monoxide to the action of hydrogen at pressures in the range of from about 150 to about 500 p. s. i. g. and temperatures in the range of from about 450° to 700° F. Linear gas velocities may vary widely; however, in general, I prefer to introduce synthesis gas at a rate of from about 0.5 to 1 ft. per second.

The high activity of the catalytic film applied to the reactor wall, in accordance with my invention, may be further illustrated by the following specific example.

*Example*

Into a synethesis reactor 20 ft. long and having a diameter (I. D.) of 2 in., a 15 per cent suspension of —100 mesh raw mill-scale hydrocarbon synthesis catalyst in heavy synthesis oil was introduced by means of a pressure spray. The catalyst employed contained 0.7 per cent by weight of potassium oxide as promoter. After the film of catalyst had been deposited throughout the interior of the reactor, hydrogen was introduced for 24 hours at 700° F. and 250 p. s. i. g. pressure to substantially completely reduce the catalyst to metallic iron. After reduction the following conditions were established:

Fresh feed rate_____ s. c. f. h__ 120
Ratio of $H_2$ to CO in fresh feed_____ 2.6
Recycle ratio_____ 1.8
Reactor pressure_____p. s. i. g__ 250
Total feed inlet temperature_____ ° F__ 600
Temperature of heat exchange
 medium_____ ° F__ 600

Gas samples were taken from several points in the system; typical analyses are given below:

| Sample Point | Per Cent $CO_2$ | Per Cent CO | Per Cent $H_2$ |
|---|---|---|---|
| Before feed preheater | 10.8 | 19.0 | 56.7 |
| Reactor inlet | 10.6 | 18.6 | |
| Reactor outlet | 13.5 | 15.1 | |
| Filter drum (filters bypassed) | 16.1 | 11.7 | |
| Wax drum | 15.8 | 12.3 | |
| Vent gas | 15.5 | 12.2 | 53.1 |

Conversion of carbon monoxide was 48 per cent based on total feed and 82 per cent based on fresh feed. From the data it was indicated that 50 per cent of the total conversion was occurring in the reactor tube. Liquid hydrocarbons were produced under these conditions and the conversion showed no decrease after one week's operation. Thereafter, the reactor was shut down and a catalyst sample was scraped from the reactor wall and analyzed by X-ray. The analysis showed the iron content to be essentially all $Fe_2C$ with some $Fe_3O_4$. The catalyst layer on the inner surface of the reactor wall was 0.01 in. in thickness and the carbon content of the layer amounted to about 50 per cent, thus leaving approximately 100 grams of iron acting as a catalyst in the reactor. With the flow rates used, this corresponds to a space velocity of over 200 s. c. f. h. of carbon monoxide per pound of iron. Comparing the conversion in the above-mentioned 2 inch reactor at this space velocity to the normal operation of an 8 inch (I. D.) reactor 20 ft. in length and employing a fluidized bed of the same catalyst, the same conversion is achieved with a space velocity of about 20 s. c. f. h. of carbon monoxide per pound of iron. From this information it will be seen that the catalyst layer deposited upon the interior surface of the 2 inch reactor, in accordance with the present invention, is approximately ten times as active as a normal fluidized catalyst bed.

The foregoing example, of course, is to be interpreted as merely illustrative of the process of my invention and is to be in no way regarded as limitative since numerous applications of the principle taught herein will readily occur to those skilled in the art. Thus, while the present description has emphasized the application of my invention to effecting the synthesis of hydrocarbons from carbon monoxide and hydrogen, it may be applied with equal success to other vapor phase exothermic reactions that yield during the reaction a substance which functions as a binder to retain the catalyst on the reactor surface as herein set forth.

The expression "raw catalyst" as used herein with reference to hydrocarbon synthesis catalysts is intended to refer to the material in oxide form. While this form of the catalyst is active to a limited extent under certain conditions, it is generally not considered to be as desirable as the metal catalyst derived from the substantially complete reduction of the corresponding metal oxide.

What I claim is:

1. A method for producing a highly active film of hydrocarbon synthesis catalyst from about 0.01 to about 0.06 in. in thickness on the surfaces of a synthesis reactor with which synthesis gas comes in contact, which comprises depositing on said surfaces a mixture of heavy hydrocarbon synthesis oil and from about 1 to about 25 weight per cent of a raw finely divided hydrocarbon synthesis catalyst to produce on said surfaces a film of finely divided raw catalyst of said thickness, and thereafter effecting reduction of the raw catalyst to yield a reduced material which is at least about ten times more active than a fluidized bed of the same catalyst under comparable synthesis conditions.

2. A method for producing and maintaining a relatively thin highly active film of catalyst on the interior surfaces of a synthesis reactor with which hydrocarbon synthesis gas comes in contact, which comprises forming on said surfaces a thin film of finely divided active catalyst and a hydrocarbon binder selected from the group consisting of a heavy hydrocarbon synthesis oil fraction and melted hydrocarbon synthesis wax, and thereafter converting the synthesis gas into useful products by bringing said gas into contact with said film in a phase free from suspended hydrocarbon synthesis catalyst under synthesis conditions while continuously generating catalyst binder within said reactor and depositing said binder on said surfaces whereby said catalyst is retained in the form of a thin film on the interior surface of the reactor during synthesis.

3. The method of claim 2 in which an iron hydrocarbon synthesis catalyst is employed.

4. A method for producing and maintaining a relatively thin highly active film of hydrocarbon synthesis catalyst on the interior surfaces of a synthesis reactor with which hydrocarbon synthesis gas comes in contact, which comprises depositing on said surfaces a thin film consisting essentially of a finely divided raw hydrocarbon synthesis catalyst and a hydrocarbon binder selected from the group consisting of a heavy hydrocarbon synthesis oil fraction and melted hydrocarbon synthesis wax, effecting reduction of the raw catalyst to obtain a substantially pure metal catalyst, and thereafter converting the synthesis gas into useful products by bringing said gas into contact with said catalyst in a phase free from suspended hydrocarbon synthesis catalyst under synthesis conditions while continuously generating catalyst binder within said reactor as a product of the catalyzed reaction and depositing said binder on said surfaces whereby said catalyst is retained on the interior of said reactor surfaces during synthesis.

5. A method for producing and maintaining a relatively thin highly active film of hydrocarbon synthesis catalyst on the surfaces of a synthesis reactor with which hydrocarbon synthesis gas comes in contact, which comprises depositing on said surfaces a suspension of finely divided raw hydrocarbon synthesis catalyst and a hydrocarbon binder selected from the group consisting of a heavy hydrocarbon synthesis oil fraction and melted hydrocarbon synthesis wax, effecting reduction of the raw catalyst to obtain a substantially pure metal catalyst, and thereafter converting the synthesis gas into useful products by bringing said gas into contact with said catalyst in a phase free from suspended hydrocarbon synthesis catalyst under synthesis conditions while continuously generating catalyst binder within said reactor as a product of the catalyzed reaction and depositing said binder on said surfaces whereby said catalyst is retained on the interior of the reactor during synthesis.

JAMES E. LATTA.

REFERENCES CITED

The following references are of record in the file of this patent:

UNITED STATES PATENTS

| Number | Name | Date |
|---|---|---|
| 1,043,580 | Eldred | Nov. 5, 1912 |
| 2,034,715 | Dreyfus | Mar. 24, 1936 |
| 2,042,451 | Bond | June 2, 1936 |
| 2,224,049 | Herbert | Dec. 3, 1940 |
| 2,266,161 | Campbell | Dec. 16, 1941 |
| 2,481,089 | Dickinson | Sept. 6, 1949 |